Nov. 3, 1964  G. A. FRANCIS  3,155,851

LINEAR INDUCTION MOTOR CONSTRUCTION

Filed May 22, 1961  3 Sheets-Sheet 1

INVENTOR.
GERALD A. FRANCIS

BY Lindsey, Prutzman and Hayes

ATTORNEYS

Nov. 3, 1964  G. A. FRANCIS  3,155,851
LINEAR INDUCTION MOTOR CONSTRUCTION
Filed May 22, 1961  3 Sheets-Sheet 2
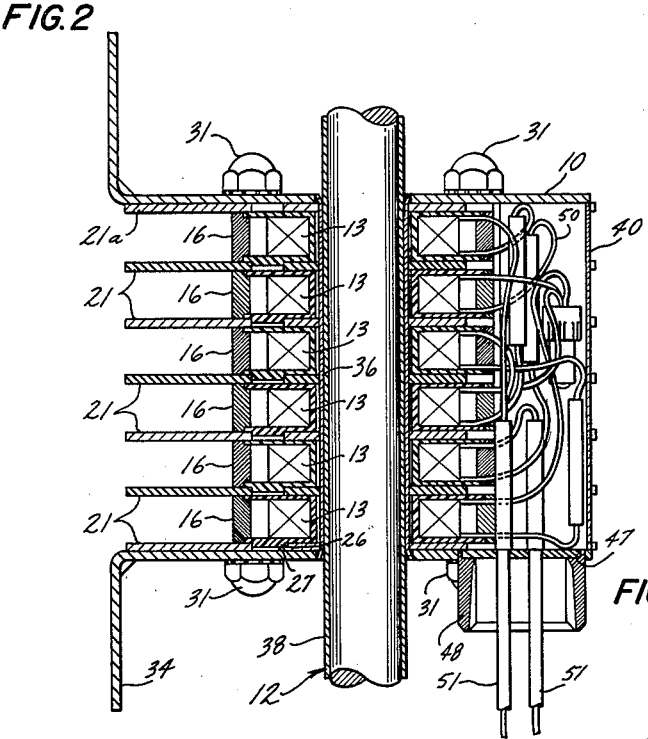
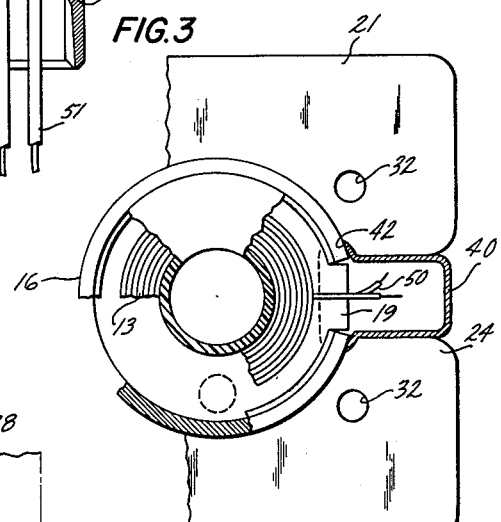
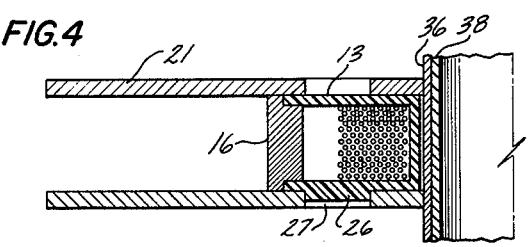
INVENTOR.
GERALD A. FRANCIS
ATTORNEYS

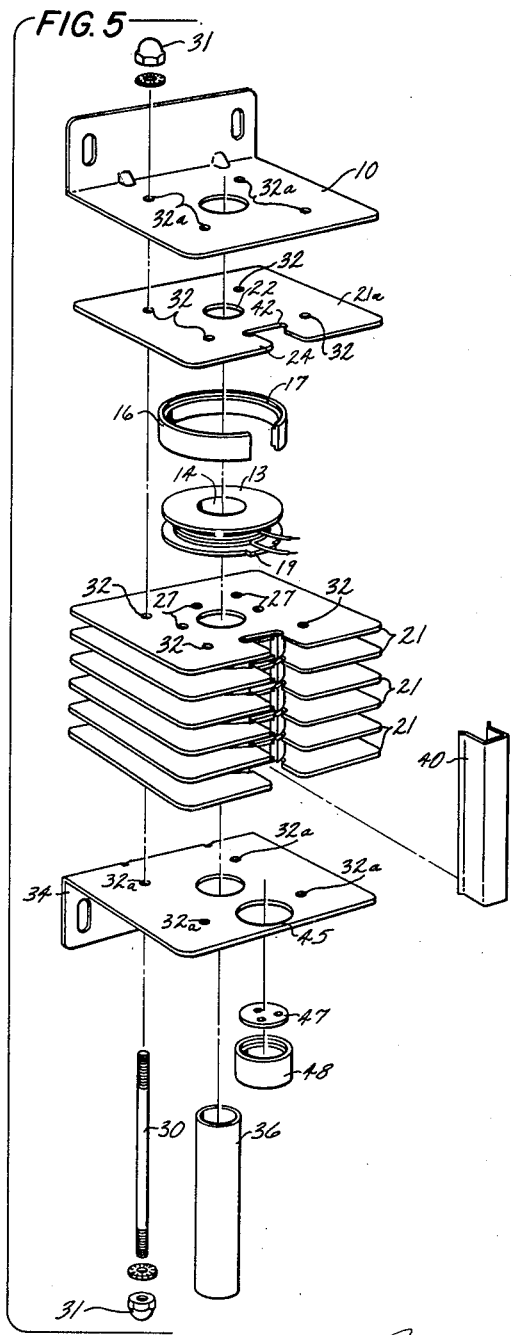

_United States Patent Office_ 3,155,851
Patented Nov. 3, 1964

3,155,851
LINEAR INDUCTION MOTOR CONSTRUCTION
Gerald A. Francis, West Hartford, Conn., assignor to Skinner Precision Industries, Inc., New Britain, Conn., a corporation of Connecticut
Filed May 22, 1961, Ser. No. 111,662
10 Claims. (Cl. 310—13)

This invention relates generally to induction motors and is more specifically directed to the provision of an improved electromechanical linear actuator.

It is a general object of this invention to provide an improved linear actuator capable of long stroke operation with uniform accurately controlled output force characteristics.

It is a further object of this invention to provide an improved linear actuator whose direction of operation is easily reversible by electrical means without alteration of the output force or other operating characteristics.

An additional object of this invention is the provision of an improved linear actuator utilizing modular construction permitting economical manufacture, durable and reliable operation while being easy to modify so as to vary the force characteristics and susceptible of economical repair without special tools.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 2 is a cross-section view of the actuator of FIG. 1;

FIG. 3 is a cross-section view showing details of a typical coil and stator plate arrangement;

FIG. 4 is an enlarged cross-section view of a portion of the stator construction shown in FIG. 2;

FIG. 5 is an exploded perspective view of the actuator of FIG. 1; and

Figure 1:
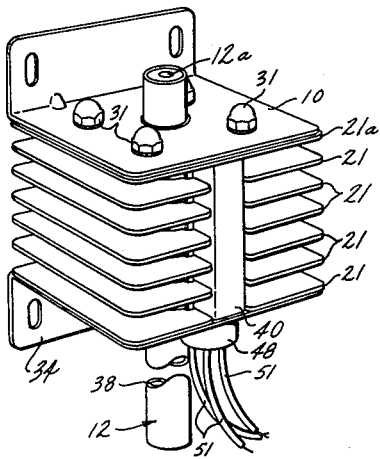
FIG. 1 is a perspective view of one embodiment of this invention.

Referring to the drawings and particularly to FIGS. 1, 2 and 5, there is illustrated a preferred embodiment of the present invention which comprises a stator, generally designated 10, and a movable plunger or rod designated 12 supported therein for relative longitudinal movement and provided with a threaded aperture 12a at each end to effect connection to the load device. The linear actuator of this invention is an improvement upon the actuator disclosed and claimed in application Serial No. 851,326 entitled Electromagnetic Actuator filed November 6, 1959 by Messrs. Bergslien and Radnick and assigned to the assignee of the present invention.

The illustrated preferred embodiment discloses a linear actuator whose stator utilizes six field coils suitably connected to provide an electromagnetic field which "moves" along the axis of the plunger 12, although it is to be understood that other combinations of field coils may be utilized in accordance with the output force and operating characteristics that are desired. Each field coil 13 is wound on a bobbin or spool having a central aperture or passageway 14, and each bobbin is provided with a generally C-shaped coil housing 16 made of suitable magnetic material and can be provided with edge grooves 17 which rest on the flanges or sides of the bottom when assembled, if desired. To facilitate assembly of the bobbin and housing, one flange or rim of the bobbin is provided with a radially extending tab 19 which assists in circumferentially positioning the housing relative to the bobbin such that the opening of the C is radially aligned with the tab 19 to provide an opening through which the coil connecting leads can be brought.

Adjacent to each coil and housing is positioned a generally rectangular stator plate 21, which plate is apertured at 22 and provided on one side with an inwardly extending notch 24. The diameter of aperture 22 is preferably slightly less than the diameter of passageway 14 in the coil bobbin and the notch is positioned in the stator plate so as to be in alignment with the tab 19 on the bobbin when the apertures 14 and 22 are coaxially aligned. To facilitate the alignment of the coil bobbin and its adjacent stator plate, each bobbin and its associated plate are provided with cooperating positioning elements which, in the preferred embodiment include a plurality of projections 26 provided on the bobbin (see FIGS. 3 and 4), which cooperate with suitable recesses or apertures 27 formed in the adjacent stator plate so as to positively position the coil bobbin coaxially relative to the aperture in the stator plate.

In its simplest form the stator can be said to be made up of a plurality of modules, each module comprising a field coil on its bobbin 13, a coil housing 16 positioned on the rim of the bobbin and a stator plate or tooth 21. These modules are stacked with the plate apertures 22 aligned to provide an alternate arrangement of stator teeth and coils throughout the length of the stator 10. It is apparent, however, that to complete the magnetic circuit of the stator it is necessary to provide an extra stator plate 21a at one end of the module stack as shown in the drawings.

The stator modules are held together in proper alignment by a plurality of studs 30 which are threaded at each end to receive suitable nuts 31 and which pass through suitable apertures 32 provided in each stator plate. In the illustrated preferred embodiment having end mounting plates 34, the studs also pass through additional apertures 32a in these plates to clamp the entire stator assembly together. If desired, a non-magnetic bearing tube 36, dimensioned to closely engage the inner periphery of the apertures 22 in the stator teeth 21, can be positioned in the passageway defined by the sidewalls of the stator apertures to preclude entry of foreign materials and enhance the support characteristics of the stator for the plunger in certain applications.

Referring now particularly to FIG. 4, it is noted that there is illustrated a magnetic circuit for flux produced from any coil in the stack, which magnetic circuit includes stator teeth 21 on each side of the coil 13, the coil housing 16, and the plunger or rod 12 which is also made of a magnetic material and provided with a continuous tubular conductor 38 closely engaging its outer periphery and made in accordance with the teachings of the aforementioned application Serial No. 851,326.

Figure 6:
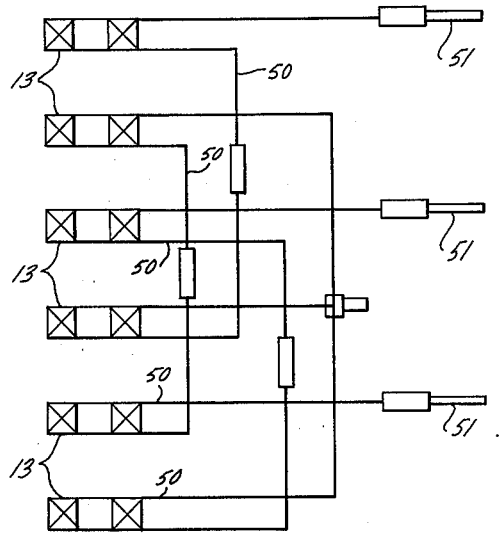
FIG. 6 is a wiring diagram of the actuator of FIG. 1 connected for three-phase operation.

As previously noted, each stator plate is notched and, when stacked in a completed stator, these notches define a passageway through which connections can be established to each of the coils in any desired sequence. As most clearly seen in FIGS. 2, 3 and 5, a cover strip formed of any suitable material is made generally U-shaped to fit within the notch and is provided with outwardly turned legs 40 which engage recesses 42 at the inner edges of the notch in each stator plate. The desired connections are made within the passageway and covered by the cover strip with the connections extending outwardly through a suitable aperture 45 in one of the end plates in which a fiber spacer disc 47 and a coupling 48 are supported. The illustrated preferred embodiment as best seen in a schematic diagram, FIG. 6 provides six coils interconnected by suitable wires 50 for three-phase operation such that three leads 51 are brought outwardly from the connection channel or internal terminal box for connection to an appropriate power source.

The foregoing construction greatly simplifies the problems of heat dissipation since each stator plate, while being an integral part of the stator magnetic circuit, can be dimensioned to extend outwardly of the coils by a substantial distance so as to define heat dissipating fins extending throughout the full length and width of the stator. Such an arrangement not only improves the heat dissipation by radiation and conduction, but facilitates the provision of forced air cooling in particular applications.

It is also to be noted that each stator coil and bobbin 13, each coil housing 16, and each stator tooth or stator plate 21 can be made substantially the same and the aforementioned bobbin projections 26 and plate recesses 27 cooperate between adjacent coils and stator plates to align the components of each module during the assembly procedure. While any desired mode of clamping can be utilized to hold the entire stator assembly together the aforementioned construction lends itself to clamping by conventional threaded fasteners which perform the dual function of holding the assembly together and accurately aligning the various modules.

In accordance with the same basic operating principles set forth in the aforementioned application Serial No. 851,326, the present device operates upon induction motor techniques such that proper connection of the field coils to a poly-phase source of electric energy produces an electromagnetic field which moves along the axis of the aligned apertures in the stator plates. As is seen in FIG. 6 adjacent coils are physically displaced and energized by an electrical current which is displaced in time by that of the adjacent coil thereby to produce a traveling electromagnetic field that moves along the axis of the passageway. This moving field induces currents in the conductive sleeve carried by the plunger and the resultant forces cause the plunger to move relative to the stator. The direction of movement is, of course, easily controlled as well as determined by the phase sequence of energization of the field coils and reversal of operation can be accomplished by simple electrical switching. Of course, the actuator can be energized from a single phase source or from other power sources through utilization of conventional induction motor techniques.

The resultant actuator produces smooth operation exhibiting uniform output force characteristics which are easily controlled in accordance with the energization of the field coils. Additionally, it is to be observed that the substantial identity of stator component parts greatly reduces the normal complexity of manufacture, simplifies assembly and disassembly and renders the device virtually foolproof in normal operation.

As will be apparent to persons skilled in the art, various modifications and adaptations of the structure above described will become readily apparent without departure from the spirit and scope of the invention, the scope of which is defined in the appended claims.

I claim:

1. A linear induction motor comprising a stator having a plurality of substantially identical stator modules arranged in side-by-side relationship, each said stator module comprising a coil winding, a magnetic stator plate adjacent said winding and having an aperture therein and a magnetic coil housing disposed about said winding, means securing said stator modules together with the aperture in each stator plate coaxial and their inside walls describing a passageway extending throughout the stator, with the windings arranged about the passageway, and with each coil housing in low reluctance contact with adjacent stator plates, a magnetic rod movably positioned within the passageway in said stator, a conductor disposed about said rod and attached thereto, and means for connecting each said coil to a source of electrical energy to produce a magnetic field that travels along the passageway.

2. A linear induction motor comprising a stator having a plurality of substantially identical stator modules arranged in side-by-side relationship, each said stator module comprising a coil winding, a magnetic stator plate adjacent said winding and having an aperture therein, and a magnetic coil housing disposed about said winding, each said stator plate being dimensioned to extend outwardly a substantial distance beyond said coil housing, means securing said stator modules together with the apertures in each stator plate coaxial and their inside walls describing a passageway extending throughout the stator, with the windings arranged about the passageway, and with each coil housing in low reluctance contact with adjacent stator plates, a magnetic rod positioned within the passageway in said stator, a continuous tubular conductor having an outside diameter less than the diameter of the aperture in each said stator plate and being arranged in intimate contact with said rod, and means for connecting each said coil to a source of electrical energy to produce a magnetic field that travels along the axis of the passageway.

3. The linear induction motor as set forth in claim 1 wherein each said coil winding is placed on a coil bobbin having at least one projection thereon and wherein each said stator plate is provided with a recess cooperating with the projection on said coil so as to accurately position the coil bobbin relative to the aperture in the stator plate.

4. A linear induction motor comprising a stator having a plurality of substantially identical stator modules arranged in side-by-side relationship, each said stator module comprising a coil winding mounted on a bobbin, a magnetic stator plate having an aperture therein and a magnetic coil housing disposed about said winding, each said stator plate being dimensioned to extend outwardly a substantial distance beyond said coil housing and being provided with means cooperating with its adjacent bobbin to position the bobbin relative to the aperture in the plate, means securing said stator modules together with the apertures in each stator plate coaxial and their inside walls describing a passageway extending throughout the stator, and with each housing in low reluctance contact with the adjacent stator plates, a non-magnetic bearing tube having thin wall characteristics extending throughout the passageway in close engagement with the side walls of the aperture in each stator plate, a magnetic rod positioned within the tube, said rod having a continuous tubular conductor extending thereabout and attached thereto over substantially its full length, and means for connecting each said coil to a source of electrical energy to produce a magnetic field that travels along the axis of the bearing tube.

5. A linear induction motor comprising a stator having a plurality of apertured magnetic stator plates and winding coils alternately arranged with the apertures in said plates coaxial and their inside walls describing a passageway extending throughout the stator, each said coil being disposed about the passageway, a magnetic coil housing disposed about each winding in low reluctance engagement with adjacent stator plates, a magnetic rod movably positioned within the passageway in said stator plates, a continuous tubular conductor disposed about said rod and in close engagement therewith, and means for connecting each said coil to a source of electrical energy to produce a magnetic field that travels along the axis of the passageway.

6. The linear induction motor as set forth in claim 5 wherein a non-magnetic bearing tube is positioned within the passageway described by the side walls of apertures in said stator plates and in close engagement therewith and said rod is positioned within said tube.

7. The linear induction motor as set forth in claim 5 wherein said stator plates extend radially outwardly a substantial distance beyond the magnetic coil housings.

8. A linear induction motor comprising a stator having a plurality of apertured magnetic stator plates and bobbin mounted field coils alternately arranged with the apertures in said plates coaxial and their inside walls describing a passageway extending throughout the stator, each adjacent bobbin and stator plate being provided with cooperating positioning means to locate the passageway in the bobbin substantially coaxial with the aperture in the stator plate, a magnetic coil housing disposed about each bobbin and in low reluctance engagement with adjacent stator plates, a magnetic rod movably positioned within the passageway in said stator plates, a continuous tubular conductor disposed about said rod, and means for connecting each said field coil to a source of electrical energy to produce a magnetic field that travels along the axis of the passageway.

9. The linear induction motor as set forth in claim 8 wherein each said stator plate is provided with a radially extending notch terminating adjacent to the outer periphery of the bobbin, wherein each coil housing is generally C-shaped with the opening therein aligned with said notch and a generally U-shaped cover plate is positioned within said notch and defines a terminal box for establishing connections to the field coils.

10. The linear induction motor as set forth in claim 2 wherein each said stator plate is provided with a radially extending notch terminating adjacent the outer periphery of the coil associated therewith and each said magnetic coil housing is generally C-shaped with the opening therein positioned in alignment with the notch in the associated stator plate and a generally U-shaped cover plate is positioned within said notch and defines a terminal box for establishing connections to the coils.

References Cited in the file of this patent

UNITED STATES PATENTS

| | | |
|---|---|---|
| 783,001 | Wagner | Feb. 21, 1905 |
| 924,195 | Scribner | Jan. 8, 1909 |
| 1,074,396 | West et al. | Sept. 30, 1913 |
| 1,922,182 | Wagner | Aug. 15, 1933 |
| 2,483,895 | Fisher | Oct. 4, 1949 |
| 2,769,104 | Hirsch | Oct. 30, 1956 |
| 2,803,761 | Young | Aug. 20, 1957 |
| 2,831,990 | Young | Apr. 28, 1958 |

FOREIGN PATENTS

| | | |
|---|---|---|
| 840,950 | Great Britain | Sept. 22, 1958 |